United States Patent
Chatterjee et al.

[19]

[11] Patent Number: 5,900,328
[45] Date of Patent: May 4, 1999

[54] MATERIALS TRANSPORTING ELEMENT

[75] Inventors: Dilip K. Chatterjee; Theodore R. Kolb, both of Rochester; James J. Ross, East Rochester; Syamal K. Ghosh, Rochester, all of N.Y.

[73] Assignee: Eastman Kodak Company, Rochester, N.Y.

[21] Appl. No.: 08/736,837

[22] Filed: Oct. 28, 1996

[51] Int. Cl.$^6$ .............................. B32B 9/00; C04B 35/653
[52] U.S. Cl. .............................. 428/701; 264/60; 264/63; 264/241; 264/299; 264/319; 264/320; 264/332; 501/103; 501/104; 501/105
[58] Field of Search .............................. 428/701; 264/60, 264/63, 241, 299, 319, 320, 332; 501/103, 104, 105

[56] References Cited

U.S. PATENT DOCUMENTS

| 5,338,598 | 8/1994 | Ketcham | 428/210 |
| 5,358,913 | 10/1994 | Chatterjee et al. | 501/103 |
| 5,411,690 | 5/1995 | Ghosh et al. | 264/63 |

*Primary Examiner*—Mark Chapman
*Attorney, Agent, or Firm*—Clyde E. Bailey, Sr.

[57] ABSTRACT

An improved materials transporting element useful for transporting materials in sliding contact with a ware plate, for instance in materials feeder equipment, has a high precision, durable, wear and abrasion resistant sliding surface. The transporting element may have a tetragonal zirconia polycrystal ceramic sliding surface for reciprocal sliding contact with the ware plate having a zirconia-alumina sliding surface. Alternatively, the transporting element may have a zirconia-alumina ceramic composite sliding surface with the ware plate having a tetragonal zirconia polycrystal ceramic sliding surface.

8 Claims, 4 Drawing Sheets

MATERIALS TRANSPORTING ELEMENT

TECHNICAL FIELD

This invention relates generally to an improved materials transporting element. More particularly, the invention concerns an improved materials transporting element, such as a feeder box, useful in materials feeder equipment, and the like, in which the transporting element is in reciprocating sliding contact with a sliding surface of a ware plate.

BACKGROUND OF THE INVENTION

Material feeder devices are widely used in many industries to transport particles such as powders, pellets, medicaments, metals, and the like. In compression molding operations, for instance, efficient filling of the molds with materials in the powder form has a significant bearing in determining the unit manufacturing cost (UMC). Materials transporting elements, such as feeder boxes, are used to carry loose powder to the top of the die cavity where it shakes dropping powder into a die mold. The die mold is located underneath a die retaining element or the die retaining ring which secures the die mold in position. The die mold is filled by the shaking motion of the feeder box which is connected to a hydraulic actuated cylinder. The feeder box slides on a flat surface called "ware plate" in a reciprocating motion. The time interval between the two extreme locations of the feeder box, when the compacting of the powders in the die cavity is effected. The top surfaces of the ware plate, the die retaining ring and the bottom surface of the feeder box need to be in a continuous plane for smooth operation of the powder filling mechanism. When the die cavity is filled with powder, it is compressed by the action of punches making a "green part". The proper filling of the die cavity depends, among several other factors, on the sliding motion of the bottom of the feeder box on a plate normally known as feeder box ware plate and also on the die clamp (or retaining) ring. If there is a misalignment of the feeder box with respect to the ware plate and also with respect to the die clamp (or retaining) ring or if there is a slight gap between those components, excessive powder loss results. This problem is magnified if the powder particles are very fine (submicron) or are very hard. In such cases, the jamming of the materials transporting element or feeder box (in worst case, breakage of the feeder box or ware plate or die clamp ring) can lead to interruption of the manufacturing process and a higher UMC for the part.

Misalignment of the materials transporting element or feeder box with respect to the ware plate and/or with respect to die retaining ring can occur due to gouging of one of the surfaces, which is a common occurrence in industrial compression molding machines where the box and the plate and also the clamp ring are usually made of metallic materials, such as steels. Our experience indicates that ceramic materials may have some unexpected advantages in such molding components, although the prior art currently does not support this conclusion. This is because most of the conventional high performance ceramics are extremely brittle. An example of a material having good hardness and strength is monolithic cubic spinel, however, this material is also highly brittle and is unusable for structural applications. Thus skilled artisans are more inclined to experiment with alternative metallic components in materials feeder. Repeated sliding of two surfaces of metal parts, as in this specific case of surfaces of feeder box and the ware plate (or die retaining ring), usually leads to excessive wear and abrasion of those surfaces leading to the loss of materials, contaminating the powder feed, and also creating a gap between the box and the plate and also between the feeder box and the die clamp ring. This gap between the feeder box and the ware plate and also between the feeder box and the die retaining ring leads to the loss of powder, and in some cases jamming of the feeder mechanism. Normally, the machine components will begin to show signs of wear at about 5000 cycles of operation. At about one million cycle, the feeder plate will have to be replaced, if not sooner. Powdered material will start leaking out from under the feeder box and falling on the rest of the movable components of the machine making maintenance a large problem. Also, the motion of the feeder box will become agitated and impede the free flowing motion of powder during die filling.

Therefore, a need persists for an improved materials transporting element and method of making same, useful for materials processing equipment, which has superior wear and abrasion resistance while being cost effective and easy to manufacture.

SUMMARY OF THE INVENTION

It is, therefore, an object of the present invention to provide an improved, high precision materials transporting element that is reliable, simple to use and cost effective to manufacture.

It is another object of the invention to provide a high precision materials transporting element in which a sliding surfaces has improved wear and abrasion resistance, and therefore, a longer useful life.

It is a feature of the invention that the improved materials transporting element has a ceramic sliding surface comprising selectively tetragonal zirconia polycrystal ceramic (Y-TZP) or zirconia-alumina ceramic composite.

Accordingly, for accomplishing these and other objects, features and advantages of the invention, there is provided, in one aspect of the invention, an improved materials transporting element useful for transporting materials in sliding contact with a ware plate having a tetragonal polycrystal zirconia ceramic sliding surface, the improvement comprising the transporting element having a sliding portion comprising zirconia-alumina ceramic for slidably contacting said tetragonal zirconia polycrystal ceramic sliding surface of said ware plate.

In another aspect of the invention, an improved materials transporting element useful for transporting materials in sliding contact with a ware plate having a zirconia-alumina ceramic composite sliding surface, the improvement comprising the transporting element having a tetragonal zirconia polycrystal ceramic sliding surface for reciprocally slidably contacting said zirconia-alumina ceramic composite sliding surface of said ware plate.

In yet another aspect of the invention, a method of making an improved ceramic materials transporting element, the method comprising the steps of: (a) providing a ceramic powder comprising particulate zirconium oxide and a secondary oxide selected from the group consisting of MgO, CaO, $Y_2O_3$, $Sc_2O_3$, and rare earth oxides, wherein said secondary oxide has a concentration, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of said zirconium oxide mixed with a binder, said compacting further comprising forming a blank; (b) providing a mold for receiving and processing said ceramic powder; (c) compacting the ceramic powder in said mold to form a ceramic green preform; (d) shaping said ceramic green preform so as to form a transporting element having a near net-shaped ceramic sliding surface; (e) sintering said materials transporting element having the near net-shaped ceramic sliding surface thereby forming a sintered ceramic sliding surface; and, (f) further shaping said sintered sliding surface.

It is, therefore, an advantage of the invention that the improved materials transporting element is reliable, easy to use, cost effective and efficient to practice. Moreover, the improved materials transporting element made with the method of the invention imparts low cost to the product, while having characteristically high reliability, a longer life, easier manufacturability, and improved wear and abrasion resistance.

BRIEF DESCRIPTION OF THE DRAWINGS

The above mentioned and other objects, features and advantages of the invention and the manner of attaining them will become more apparent and the invention itself will be better understood by reference to the following description of an embodiment of the invention taken in conjunction with the accompanying drawings, wherein.

DETAILED DESCRIPTION OF THE PREFERRED EMBODIMENTS

Figure 1:
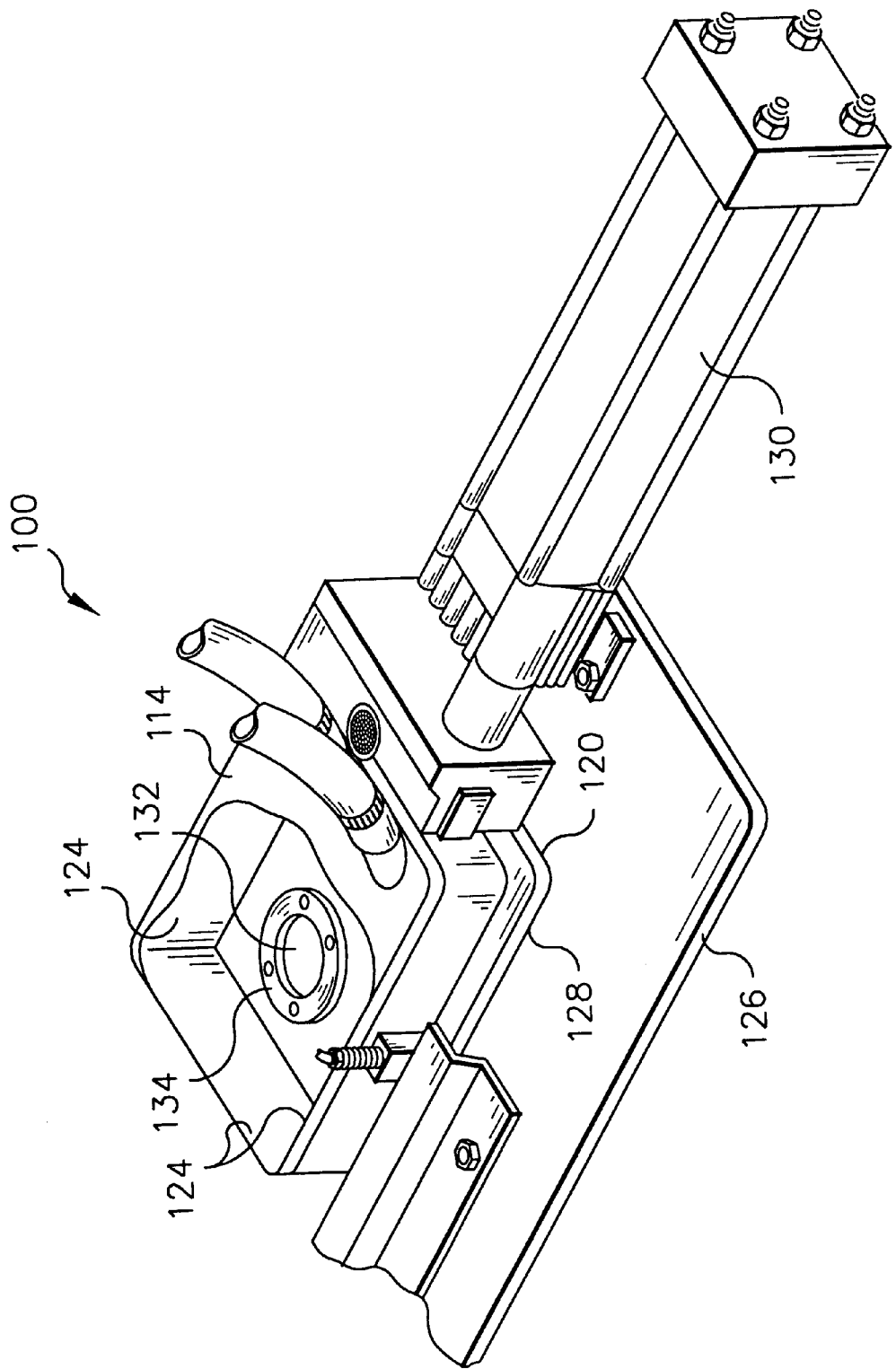
FIG. 1 is a perspective view of the materials feeder equipment of the invention.
Figure 2:
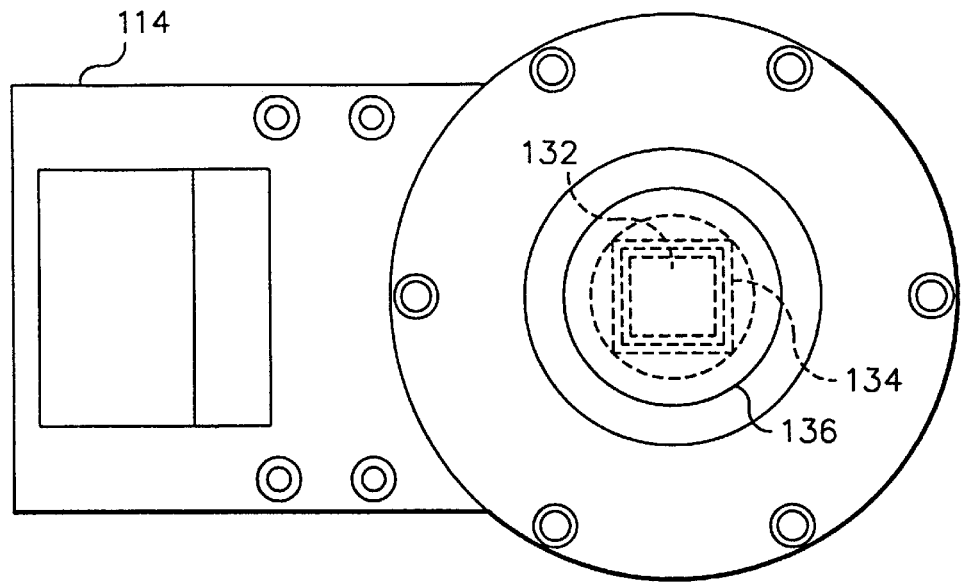
FIG. 2 is a top plan view of the materials feeder equipment of the invention.
Figure 3:
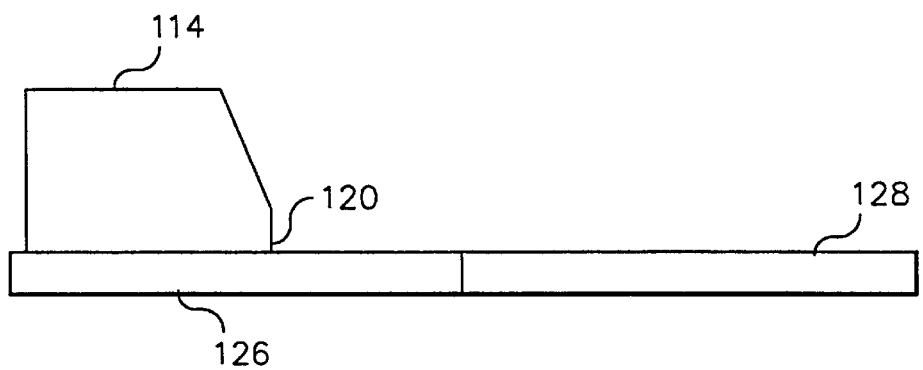
FIG. 3 is a side view of the materials feeder equipment showing the feeder box in the first position along the ware plate.
Figure 4:
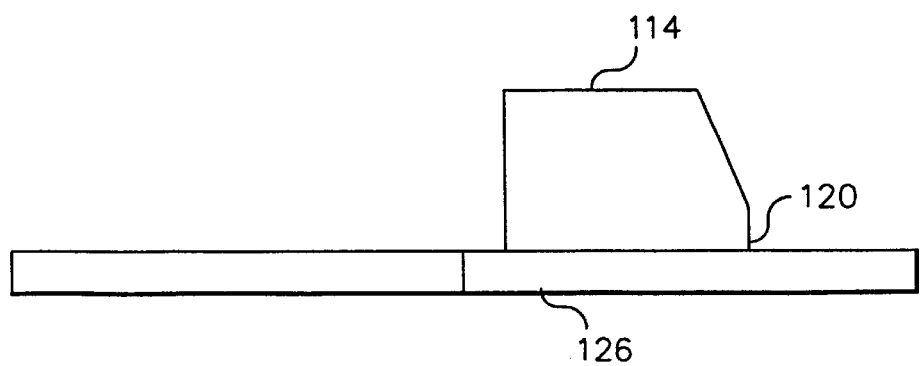
FIG. 4 is a side view of the materials feeder equipment of the invention showing the feeder box in a second position on the ware plate.

To overcome the aforementioned problems in the prior art, we carefully manufactured and investigated special ceramic materials for use in the materials feeder equipment 100 of our invention. After considerable investigation and surprise we found that ytrria-doped tetragonal zirconia polycrystal (Y-TZP) ceramic materials offer many advantages over conventional materials, including many other ceramics. Y-TZP is one of the toughest ceramics. The toughness is achieved at the expense of hardness and strength. Tetragonal zirconia-alumina composite, that is, the product of sintering a particulate mixture of zirconia alloy and alumina, is another tough and relatively softer structural ceramic composite In FIGS. 1–4, an improved materials feeder equipment 100 according to the principles of the invention is illustrated. Materials feeder equipment 100 may have a dispenser, such as a hopper (not shown), for respectively receiving and then dispensing materials. A transporting element or feeder box 114 is provided having means, such as an opening, to receive materials from the dispenser and a second opening (not shown) for controllably releasing the materials from the materials transporting element or feeder box 114. Importantly, materials transporting element or feeder box 114 has a sliding surface or base, also referred to as first sliding portion, 120, comprising either tetragonal zirconia polycrystal ceramic or zirconia-alumina ceramic composite. Base 120 further has sidewalls 124 surrounding base 120 for containing the materials therein. Moreover, materials feeder 100 comprises a ware plate 126 which slidably supports materials transporting element or feeder box 114. It is important to the invention that ware plate 126 includes a second sliding portion 128 formed at least partially of either a zirconia-alumina ceramic composite or tetragonal zirconia ceramic, as described in details below. Second sliding portion 128 of the ware plate 126 is arranged for sliding contact with the first sliding portion 120 of the base 120 of feeder box 114. Preferably, ware plate 126 is stationary and the first sliding portion 120 of feeder box 114 is slidable along second sliding portion 128 of ware plate 126.

Means, such as a pneumatically controlled ram 130 is used slidably moving the first sliding portion 120 of the feeder box 114 along the second sliding portion 128 of the ware plate 126. Feeder box 114 is configured to move between a first position where loose powder is fed into the feeder box 114 through, for instance a hopper (not shown), and a second position where the loose powder is released from the feeder box 114 into a die cavity 132, described below.

In an alternative embodiment of the invention, a die cavity 132 may be arranged in the ware plate 126 for receiving powder released by the feeder box 114 when said feeder box 114 is in the second position, as described above. A die retaining element, or alternatively a die retaining ring, 134, is arranged in the die cavity 132 to secure the die cavity 132 during materials processing. Thus, die retaining ring 134 comes into sliding contact with the first sliding portion 120 of feeder box 114. Moreover, die retaining ring 134 is arranged in a continuous plane with the ware plate 126 so that feeder box 114 can travel smoothly between the first and second positions. Finally, a die punch 136 is arranged above the ware plate 126 and the second position of the feeder box 114 for accessing the die cavity 132. Thus the die punch 136 can compress the powder released into the die cavity 132 thereby forming the desired molded part.

In a preferred embodiment of the materials feeder equipment 100 of the invention, second sliding portion 128 of ware plate 126 is zirconia-alumina ceramic composite; and, first sliding portion 120 of feeder box 114 is tetragonal zirconia ceramic.

In an alternate embodiment of the invention, materials feeder equipment 100 has second sliding portion 128 of ware plate 126 comprising tetragonal zirconia ceramic; and, the first sliding portion 120 of feeder box 114 comprises zirconia-alumina ceramic composite.

In yet another embodiment of the invention, at least one catch bin may be movably positioned for alignment with a cavity in the ware plate at the second position. Each catch bin, in this embodiment, has a ceramic surface which is alignable in a continuous plane with the ware plate for slidably contacting the base of the feeder box. The ceramic surface of catch bin would comprise either tetragonal zirconia ceramic or zirconia-alumina ceramic composite, corresponding to the second sliding portion of the ware plate.

Figure 5:
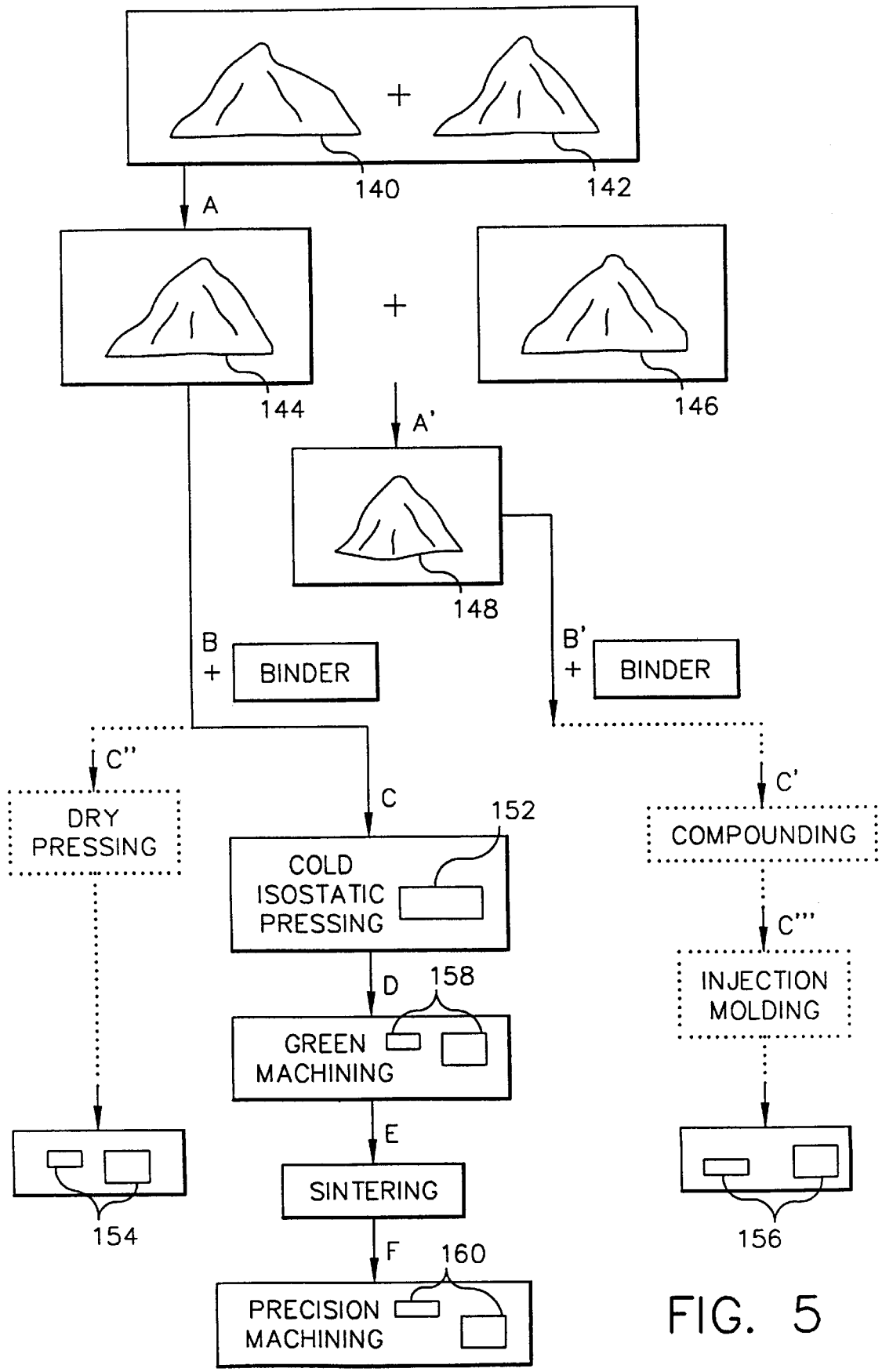
FIG. 5 is a schematic flow diagram of the method of the invention.

The method of making the improved materials feeder equipment 100 having ceramic elements (described above) is broadly illustrated in FIG. 5 (Steps A to F). According to the method, a ceramic powder comprising of primarily zirconium oxide alloy, or a mixture of particulate zirconium oxide alloy and a second concentration of aluminum oxide is used for making materials feeder equipment 100, as discussed fully below. Elements of the materials feeder equipment 100 made in accordance with the method of the invention is illustrated in FIG. 5 (Step F) and FIG. 6. The zirconium oxide alloy consists essentially of zirconium oxide and a secondary oxide selected from the group consisting of MgO, CaO, $Y_2O_3$, $Sc_2O_3$, and rare earth oxides. Moreover, the zirconium oxide alloy has a concentration of the secondary oxide of, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy, said compacting further comprising forming a blank A mold is provided for receiving and processing the ceramic powder. The ceramic powder is then compacted (as described below) in the mold provided to form a ceramic preform. The ceramic preform is then shaped or green-machined so as to form a near net-shaped green sliding surface for the materials transporting element. In this embodiment of the invention, after the initial shaping, the green ceramic sliding surface of the materials transporting is sintered thereby forming a sintered net-shape ceramic sliding surface, as described more fully below. The ceramic sliding surface of the materials transport element for the materials feeder equipment 100, described above, are then further machine or shaped until finished components are formed. Subsequently, the ceramic transporting element is then arranged in the materials feeder equipment 100 as described above.

More particularly, the method of making the feeder equipment elements, including the first and second sliding portions of the feeder box and ware plate, respectively, useful for the improved materials feeder equipment 100 of the invention, are set forth in details below.

Ceramic Powder Material Mixing

According to FIG. 5, step A diagrammatically illustrates the alloying process. Zirconia powder 140 is combined with one or more secondary oxide powders 142 to provide zirconia alloy powder 144. The preparation of zirconia alloys is well known to those skilled in the art and zirconia alloys are available commercially. For example, particulate zirconia alloy having 3 mole percent $Y_2O_3$ is marketed by Z-TECH Corporation, Bow, N.H., as "SYP-ULTRA 5.2 Yttria Stabilized Zirconia" (presently, HANWHA Advanced Ceramics, as "HWA-3YB") or by TOSOH Corporation of Japan, as "Z-3YB".

More particularly, we prefer using tetragonal zirconia ceramic material for manufacturing components of the ceramic materials feeder 100 in a cost effective way. The most preferred material which we prefer using is essentially zirconia having 100 percent tetragonal crystal structure. We developed this 100 percent tetragonal zirconia by alloying zirconia with a number of secondary oxides as described in U.S. Pat. Nos. 5,336,282 and 5,358,913, hereby incorporated herein by reference.

The preferred ceramic composite powder mixture most preferred in the method of making zirconia-alumina composites of the invention includes a particulate zirconia alloy and a particulate alumina made by mixing $ZrO_2$ and additional "secondary oxide" selected from: MgO, CaO, $Y_2O_3$, $Sc_2O_3$ and $Ce_2O_3$ and other rare earth oxides (also referred to herein as "Mg—Ca—Y—Sc—rare earth oxides") and then with $Al_2O_3$. Zirconia alloys useful in the methods of the invention have a metastable tetragonal crystal structure in the temperature and pressure ranges at which the ceramic article produced will be used. For example, at temperatures up to about 200° C. and pressures up to about 1000 Mpa, zirconia alloys having, wherein zirconium oxide alloy has a concentration of said secondary oxide of, in the case of $Y_2O_3$, about 0.5 to about 5 mole percent; in the case of MgO, about 0.1 to about 1.0 mole percent, in the case of $Ce_2O_3$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy, said compacting further comprising forming a blank and then sintering, exhibit a tetragonal structure. Preferred oxides for alloying with zirconia are $Y_2O_3$, MgO, CaO, $Ce_2O_3$ and combinations of these oxides. It is preferred that the zirconia powder have high purity, greater than about 99.9 percent. Specific examples of useful zirconia alloys include: tetragonal structure zirconia alloys having from about 2 to about 5 mole percent $Y_2O_3$, or more preferably about 3 mole percent $Y_2O_3$. Examples of tetragonal structure zirconia alloys useful in the methods of the invention are disclosed in U.S. Pat. No. 5,290,332. Such zirconia alloys are described in that patent as being useful to provide a "net-shape" ceramic article: a ceramic article that is dimensionally true after sintering and, therefore, does not necessitate further machining prior to use in its intended working environment.

Referring again to FIG. 5, Step A' diagrammatically illustrates an alternative mixture of particulate zirconia alloy powder 14, and a particulate aluminum oxide 146. This alternative mixture can be achieved by mixing mechanically or chemically, for example, mixing by co-precipitation. The particulate mixture formed is from about 50 to 100 percent by weight (weight/total of particulate mixture) $ZrO_2$, and preferable is from about 80 to about 99 percent by weight $ZrO_2$, or more preferably is from about 80 to about 95 percent by weigh $ZrO_2$ and the balance being $Al_2O_3$. The product of this alternative mixture is zirconia-alumina ceramic composite 148.

The grain and agglomeration sizes and distributions, moisture contents, and binders (if any) can be varied in both the alumina and the zirconia alloy, in a manner known to those skilled in the art. "Grain" is defined as an individual crystal, which may be within a particle, having a spatial orientation that is distinct from that of adjacent grains. "Agglomerate" is defined as an aggregation of individual particles, each of which may comprise multiple grains. In a particular embodiment of the invention, the grain and agglomeration sizes and distributions, and moisture contents of the alumina and the zirconia alloy are substantially the same and are selected as if the zirconia alloy was not going to be mixed with the alumina, that is in a manner known to the art to be suitable for the preparation of a zirconia alloy article.

An example of convenient particulate characteristics for a particular embodiment of the invention is the following. Purity of $ZrO_2$ is preferably well controlled at 99.9 to 99.99 percent, that is, impurities are no more than about 0.1 to 0.01 percent. The grain size is from about 0.1 micrometers to about 0.6 micrometers. The average grain size is 0.3 micrometers. The distribution of grain sizes is: 5–15 percent less than 0.1 micrometers, 40–60 percent less than 0.3 micrometers, and 85–95 percent less than 0.6 micrometers. The surface area of each individual grain ranges from about 10 to about 15 $m^2$/gram or is preferably 14 $m^2$/gram. Agglomerate size is from about 30 to about 60 micrometers and average agglomerate size is: 40–60 micrometers. Moisture content is about 0.2 to 1.0 percent by volume of blank and is preferably 0.5 percent. The mixture of particulate is compacted in the presence of an organic binder.

Referring once again to FIG. 5, Step B, binders such as gelatin or polyethylene glycol(PEG) or acrylic or polyvinyl ionomer or more preferably polyvinyl alcohol, are added to and mixed with the particulate mixture Y-TZP, 144 a composite mixture of Y-TZP and alumina 148, both illustrated in Step A and A' respectively. This can be achieved preferably by spray drying or ball milling prior to placement of the mixture in a compacting device.

Further, Step B also illustrates an alternative mixing process known to those who are proficient in the art as "compounding" in which the particulate mixture or mixtures are mixed with greater than 20 percent by weight of an organic binder such as paraffin at a temperature higher than the glass transition temperature of such binder for subsequent injection molding process, illustrated as Step C'.

Compacting

Figure 6:
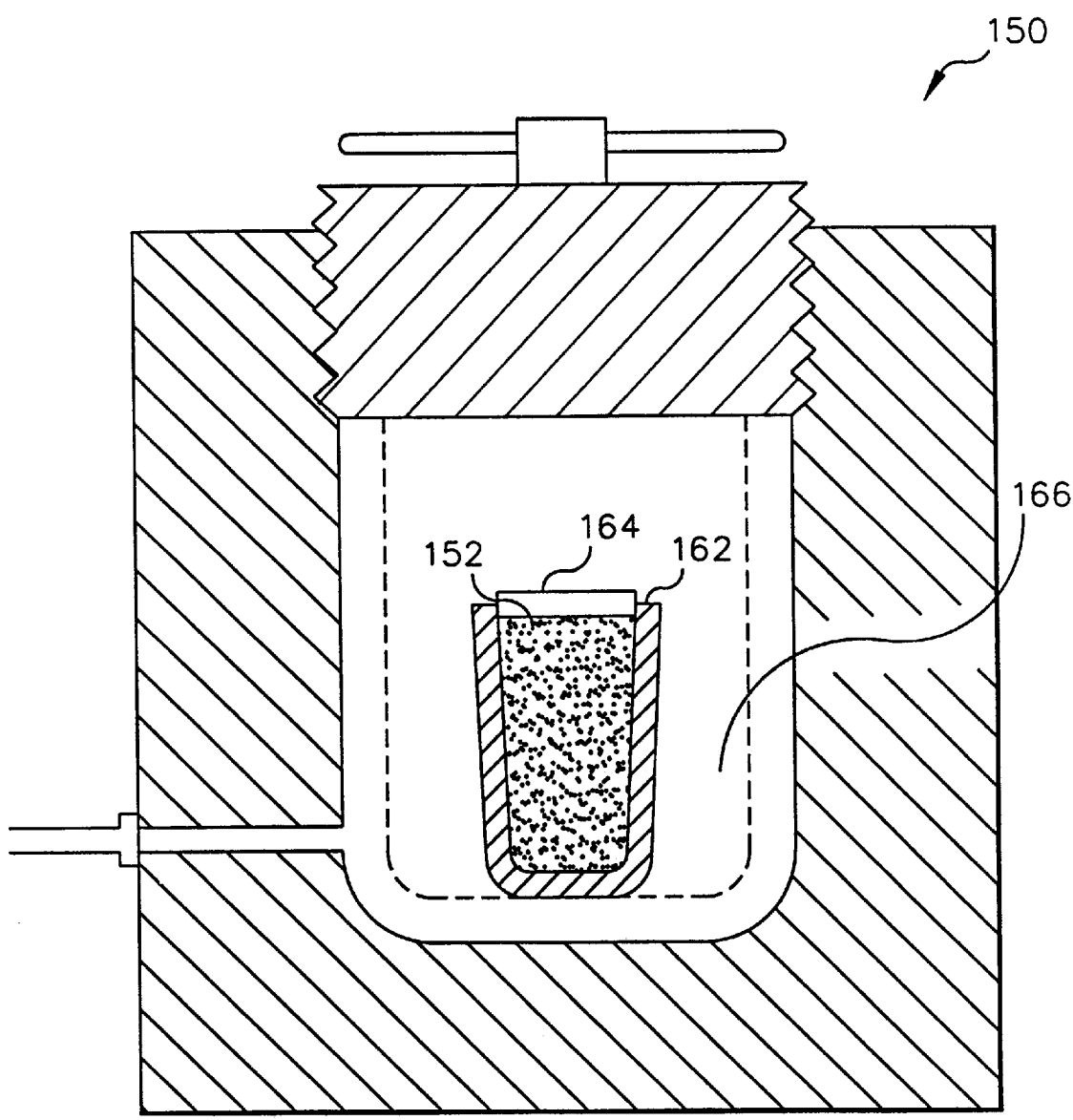
FIG. 6 is a schematic of a wet bag isostatic pressing machine useful in the method of FIG. 5.

Turning now to compacting and more particularly to the process illustrated in FIG. 5, the particulate mixture either 144 or 148 is cold compacted using preferably an isostatic press 150 (as shown in FIG. 6) to provide an unsintered blank 152 in Step C (FIG. 5). Unsintered blank 152 is alternatively referred to herein as a "green preform". It should be apparent to skilled artisans that a particular method of compacting the powder is not critical. The terms "cold compaction" and the like refer to compression of the particulate mixture at a temperature below glass transition or decomposition temperature of the organic binder. The green preform can be produced by such methods as cold uniaxial pressing (Step C" in FIG. 5), cold isostatic pressing (Step C in FIG. 5), injection molding (Step C'" in FIG. 5) or by processes such as cold extrusion and tape casting (not shown in FIG. 5). The particulate mixture is preferably subjected to uniform compacting forces in order to provide an unsintered blank which has a uniform density. Alternatively, near net-shape green blank of the compounds 154 and 156 (of materials feeder 100) are generated using dry pressing and injection molding processes respectively.

The particulate mixture of zirconia alloy and/or zirconia-alumina composite is compacted; heated to a temperature range at which sintering will occur; sintered, that is, maintained at that temperature range for a period of time; and then cooled. During all or part of sintering, the particulate mixture compact or the "green preform" is in contact with dopant, as discussed below in detail. In FIG. 5, element 152 represents the product of both mixing chemical species and binders and subsequent compaction, indicated by arrows A, A', B & C', respectively. Compaction and sintering are generally discussed herein as two consecutive operations, as indicated by steps C and E, respectively, in FIG. 5, however, the invention is not limited to a particular sequence of compacting and sintering. For example, compaction and sintering can be simultaneous in a single operation or partial compaction can be followed by sintering and further compaction. The interim product of compacting and sintering operations is referred to herein as a "blank", which is illustrated as element 152 in FIG. 5 Blank 152 is at least partially compacted and is either unsintered or not fully sintered.

In a preferred method of the invention, the powder is cold compacted to provide a "green preform", which has a "green" density that is substantially less than the final sintered density of the ceramic component 160 of materials feeder 100. It is preferred that the green density be between about 40 and about 65 percent of the final sintered density, or more preferably be about 60 percent of the final sintered density.

Referring to FIG. 6, using press 150, the cold isostatic pressing of the powder was done by filling rubber mold 162 with powder 144 or 148 and keeping the mold 162 sealed by plate 164 in autoclave 166 of cold isostatic press 150. Mold 162 is then pressurized to about 25,000 pounds per square inch. Seal plate 164 may either be a metallic material, such as aluminum or steel or a hard rubber. Thus, in accordance with FIG. 5, Step D, near-net-shape components 158 of materials feeder 100 are formed by green machining (as discussed below) of the blank 152 using carbide tools. Then the green components are sintered to full density using preferably sintering schedules described in U.S. Pat. Nos. 5,336,282 and 5,358,913, hereby incorporated hereby by reference, and final precision machining were made to tight tolerances to produce the components of materials feeder of the invention using diamond tools. Near net-shaped green preforms 154 or 156 produced either by dry pressing or by injection molding respectively, did not warrant green machining to generate net-shaped components after sintering. The near-net-shaped green preform 156 produced by injection molding needed an additional step called "debinding" wherein excess organic binders are removed by heating the preforms at around 250° C. for about 12 hours prior to sintering.

Sintering

Once again referring to FIG. 5, Step E, sintering of the green machined components of materials feeder 100 is performed in a temperature range from about 1400° C. to about 1600° C., or more preferably about 1500° C. Preferable sintering times is in the range from about 1 hour to about 3 hours, or more preferably, about 2 hours. In a particular embodiment of the methods of the invention, the sintering peak temperature is 1500° C. and that temperature is maintained for about 2 hours. It is preferred that the pre-sintered components of materials feeder 100 be slowly heated to sintering temperature and slowly cooled so as to avoid undesirable dimensional changes, distortions and crack development. In an embodiment of the invention having a preferred sintering temperature of 1500° C., preferred temperature ramps during heating are: about 0.3° C./minute for room temperature to about 300° C., about 0.1° C./minute for about 300° C. to about 400° C., about 0.4° C./minute for about 400° C. to about 600° C., and about 1.5° C./minute for about 600° C. to about 1500° C. Preferred temperature ramps during cooling are: about 2° C./minute for about 1500° C. to about 800° C. and about 1.6° C./minute for about 800° C. to room temperature.

Alternatively, sintering may be achieved in the presence of a dopant selected from: MgO, FeO, ZnO, NiO and MnO, and combination thereof, as discussed below in detail. The resulting zirconia-alumina ceramic composite components of the materials feeder of the invention has a core of ($\alpha$-alumina and tetragonal zirconia and a case of cubic spinel or cubic spinel along with cubic structure or cubic and monoclinic or tetragonal structure of zirconia alloy. For zirconia alloy ceramic, sintering in the presence of dopant selected from "Mg—Ca—Sc—rare earth oxides" will produce articles with cores having tough tetragonal crystal structure and the cases having hard cubic crystal structure.

In the sintering process, the dopant oxide selected from MgO, FeO, ZnO, CoO, NiO, and MnO, and combination thereof, is in contact with the blank. It is preferred that the sintering result in a ceramic components having a "full" or nearly theoretical density, and it is more preferred that the density of the ceramic components be from about 99.5 to about 99.9 percent of theoretical density. Sintering is conducted in air or other oxygen containing atmosphere.

The methods of the invention are not limited to any particular sintering pressure and temperature conditions. Sintering can be performed at atmospheric pressure or alternatively a higher pressure, such as that used in hot isostatic pressing can be used during all or part of the sintering to reduce porosity. The sintering is continued for a sufficient time period for the case of the article being sintered to reach a thermodynamic equilibrium structure. An example of a useful range of elevated sintering pressures is from about 69 MPa to about 207 MPa, or more preferably about 100 to 103 MPa.

The exact manner in which the dopant is in contact with the blank during sintering is not critical, however, the "case" as that term is used herein, is limited to those areas of the blank in contact with the dopant during sintering. For example, a cubic spinel and tetragonal zirconia case can be readily produced by the methods of the invention on a portion of the overall surface of an article. It is not critical that the dopant be in contact with the blank during initial sintering, that is, sintering which does not result in an increase in density to full density.

Prior to observing the results of the examples, the inventors had thought that they would be able to provide an explanation for conversion methods having any relative percentages of zirconia alloy and alumina. The inventors had expected results to be in accord with the concepts that the formation of cubic spinel is highly favored thermodynamically over the conversion of tetragonal zirconia to cubic zirconia and that the mechanism of action follows alumina concentration.

What has been discovered by the inventors is that, surprisingly, if the concentration of alumina in the blank 252 is from about 5 weight percent (relative to the total weight of zirconia and alumina) to about 50 weight percent, then the method of the invention produces an article having a case that is cubic spinel and tetragonal zirconia and a core that is a-alumina and tetragonal zirconia. During sintering, dopant, in effect, diffuses past tetragonal zirconia until all of the dopant has contacted and reacted i.e., "partitioned", with alumina. In contrast, if the concentration of alumina in the blank is less than about 5 weight percent or greater than about 75 weight percent, then the method of the invention produces an article that has a case that is substantially composted of cubic spinel and cubic zirconia or cubic and monoclinic zirconia and a core that is a-alumina and tetragonal zirconia. During sintering, dopant does not, in effect, diffuse past tetragonal zirconia until all of the dopant has contacted and reacted with alumina; but rather reacts with alumina and tetragonal zirconia in the same vicinity, leaving alumina deeper within the blank unreacted.

These results are not compatible with a simple mechanism of action based on concentration alone. The results seen are compatible with a mechanism of action based upon an unpredictable alignment of several competing factors, such as rate of diffusion of dopant during sintering.

Shaping/Machining

It is known that ceramic parts can be fabricated to net-shape by the compaction processes such as dry pressing, injection molding, slip casting, and extrusion or cold isostatic accompanied by green machining (FIG. 5, Step D). Green machining refers to the process of machining the ceramic particulate compact prior to densification. (For more general information refer to David W. Richardson, *Modem Ceramic Engineering: Properties, Processes and Use in Design*, 2nd Edition (1992)). In this process, it is important that care be exercised to avoid overstressing the fragile material and producing chips, cracks, breakage, or poor surface. For instance, it is important that the ceramic preform is held rigidly, but with no distortion or stress concentration, during green machining. The part can be rigidly held by one of a numerous ways, including by simple mechanical gripping, by bonding or potting with a combination of beeswax and precision metal fixtures, the latter being preferred by the inventors. Once the ceramic preform is secured rigidly in a fixture, green machining can be accomplished in a variety of methods, including: turning, milling, drilling, form wheel grinding, and profile grinding. The inventors prefer turning and profile grinding the preform during green machining to achieve the best results. Machining can be either dry or wet, depending on the binder present and whether or not the part has been bisque fired, i.e., fired at a high enough temperature to form bonds at particle-particle contact points, but not at a high enough temperature to produce densification.

Apart from green machining, a further precision machining Step F, according to FIG. 5, of some of the surfaces is required to meet dimensional tolerances and to achieve improved surface finish or remove surface flaws. Maintaining dimensional tolerances to the extent of few millionths of an inch or achieving surface finish to less than 10 microinches is not possible unless final machining after sintering is undertaken. We accomplished dimensional tolerances to the extent of ±100 millionth of an inch using dry pressing (uniaxial pressing) for parts for simple geometry and controlling the shrinkage by our patented sintering process. Precision machining is required when the part demands tolerances in certain dimensions less than 100 millionth of an inch and also to meet some dimensional tolerances such as roundness, perpendicularity, parallelness, etc. As contrasted with green machining, final precision machining of the sintered ceramic bearing requires diamond tooling and also sophisticated machines. Skilled artisans would know that milling, grinding, lapping and polishing are some effective procedures which are used in precision machining.

This invention is further clarified through the following examples:

WORKING EXAMPLE 1

Zirconia ceramic powder (prealloyed with secondary oxides described in U.S. Pat. Nos. 5,336,282 and 5,358,913) were packed and sealed in molds made of rubber/polyurethane of 55 to 70 durometers of Shore hardness A (preferably 65 durometers). These molds were cold isostatically pressed in an autoclave at 15 to 30 kpsi (preferably 25 kilo pounds per square inch) to obtain preforms of appropriate sizes in width and length.

WORKING EXAMPLE 2

Same as in working Example 1, except that the zirconia alloy powder is premixed with polyvinyl alcohol binder.

WORKING EXAMPLE 3

Same as in working Example 1, except that the zirconia alloy powder is premixed with acrylic binder.

WORKING EXAMPLE 4

Same as in working Example 1, except that the ceramic material is a composite of particulate zirconia alloy and particulate alumina of varying amount of from 5 to 50 weight percent. The binders used in these working examples are the same as that of in the working examples 2 and 3.

WORKING EXAMPLE 5

Preformed blanks produced by cold isostatically pressing are machined in their green state (i.e., before sintering) to produce near-net-shape articles using carbide tools in lathe and milling machines. The cutting speeds in green machining of zirconia preforms were maintained between 2800 and 3400 rpm (preferably at 32,000 rpm).

WORKING EXAMPLE 6

Near net shaped articles of working example 5 were also produced by dry pressing using a die-punch assembly and a cold compacting machine.

WORKING EXAMPLE 7

The green machined near-net-shaped components of the materials feeder made by cold isostatically pressing or near-net-shaped feeder assemblage made by cold pressing are sintered following schedule described in U.S. Pat. Nos. 5,336,282 and 5,358,913. After sintering the ceramic components of the materials feeder equipment achieved full theoretical density of 6.05 gms/cc for yttria stabilized zirconia.

WORKING EXAMPLE 8

The final precision machining of the components of the materials feeder and lapping of the reciprocating motion path were carried out using diamond tools. The surface finish of the feeder assemblage was <0.1 microns.

WORKING EXAMPLE 9

The components of the materials feeder were retrofitted in a powder compacting machine. The powder used for compacting in this machine was of an intermetallic magnetic alloy, more particularly, an alloy of neodymium-boron-iron. This alloy powder is extremely hard and brittle. The components of the materials feeder of this invention survived in excess of ten million cycles of reciprocating motion for powder feed in the die for subsequent compaction.

Comparative Example

The prior art components of the materials feeder for the compacting machine described in the above working example is made of hardened steels. When the magnetic alloy powder described in the above working example was used in such machines, the components of the materials feeder did not survive in operation even up to a million cycle.

While the invention has been described with a certain degree of particularity, it is manifest that many changes may be made in the details of the construction and the arrangement of components without departing from the spirit and scope of the disclosure. It is understood that the invention is not limited to the embodiments set forth herein for purposes of exemplification, but is to be limited only by the scope of the attached claim or claims, including the full range of equivalency to which each element thereof is entitled.

PARTS LIST

The invention has been described using the following reference numerals to identify the parts and features disclosed:

100 . . . materials feeder equipment
114 . . . materials transporting element or feeder box
120 . . . base or first sliding portion of feeder box 114
124 . . . sidewalls
126 . . . ware plate
128 . . . second sliding portion of ware plate 126
130 . . . pneumatically controlled ram
132 . . . die cavity
134 . . . retaining ring
136 . . . die punch
140 . . . zirconium oxide or zirconia powder
142 . . . secondary oxide powders
144 . . . zirconia alloy powder
146 . . . aluminum oxide or alumina
148 . . . particulate mixture of Y-tzp and alumina or zirconia-alumina composite
150 . . . isostatic press
152 . . . unsintered blank, or green preform, made by cold isostatic process
154 . . . unsintered blank, or green preforms, made by dry pressing
156 . . . unsintered blank, or green preforms, made by injection molding
158 . . . near-net shape components
160 . . . ceramic component
162 . . . rubber mold
164 . . . seal plate for rubber mold
166 . . . autoclave

We claim:

1. An improved materials transporting element useful for transporting materials in sliding contact with a ware plate having a tetragonal polycrystal zirconia ceramic sliding surface, the improvement comprising the transporting element having a sliding portion comprising zirconia-alumina ceramic for slidably contacting said tetragonal zirconia polycrystal ceramic sliding surface of said ware plate.

2. An improved materials transporting element useful for transporting materials in sliding contact with a ware plate having a zirconia-alumina ceramic composite sliding surface, the improvement comprising the transporting element having a tetragonal zirconia polycrystal ceramic sliding surface for reciprocally slidably contacting said zirconia-alumina ceramic composite sliding surface of said ware plate.

3. Method of making an improved ceramic materials transporting element, the method comprising the steps of:
   (a) providing a ceramic powder comprising particulate zirconium oxide and a secondary oxide selected from the group consisting of MgO, CaO, $Y_2O_3$, $Sc_2O_3$, and rare earth oxides, wherein said secondary oxide has a concentration, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of said zirconium oxide mixed with a binder, said compacting further comprising forming a blank;
   (b) providing a mold for receiving and processing said ceramic powder;
   (c) compacting the ceramic powder in said mold to form a ceramic green preform;
   (d) shaping said ceramic green preform so as to form a transporting element having a near net-shaped ceramic sliding surface;
   (e) sintering said materials transporting element having the near net-shaped ceramic sliding surface thereby forming a sintered ceramic sliding surface; and, (f) further shaping said sintered sliding surface, wherein said ceramic powder comprises from about 5–50% wt % $Al_2O_3$ and from about 95 to 50 wt % Y-TZP, and wherein said Y-TZP comprises about 5.2% yttria.

4. The method recited in claim 3, wherein said step of compacting comprises cold isostatically pressing said ceramic powder in said mold.

5. The method recited in claim 3, wherein said step of compacting comprises injection molding said ceramic powder.

6. The method recited in claim 5, wherein said injection molding further comprises the step of removing the binder from the ceramic green preform.

7. The method recited in claim 3, wherein said compacting step comprise dry pressing said ceramic powder.

8. The method recited in claim 3, wherein said ceramic powder comprises 20 wt % $Al_2O_3$ and 80 wt % Y-TZP, and wherein said Y-TZP comprises about 5.2 wt % yttria.

* * * * *